(12) United States Patent
Sakaguchi et al.

(10) Patent No.: US 9,594,204 B2
(45) Date of Patent: Mar. 14, 2017

(54) LIGHTING DEVICE FOR VACUUM CLEANER

(71) Applicant: Panasonic Intellectual Property Management Co., Ltd., Osaka (JP)

(72) Inventors: Tomohisa Sakaguchi, Kyoto (JP); Masaru Fujita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 5 days.

(21) Appl. No.: 14/922,096

(22) Filed: Oct. 23, 2015

(65) Prior Publication Data

US 2016/0131818 A1 May 12, 2016

(30) Foreign Application Priority Data

Nov. 10, 2014 (JP) ................. 2014-227631

(51) Int. Cl.
| | |
|---|---|
| F21V 8/00 | (2006.01) |
| F21V 33/00 | (2006.01) |
| A47L 9/30 | (2006.01) |
| A47L 9/02 | (2006.01) |
| F21W 131/30 | (2006.01) |
| F21Y 101/00 | (2016.01) |

(52) U.S. Cl.
CPC .............. G02B 6/0038 (2013.01); A47L 9/02 (2013.01); A47L 9/30 (2013.01); F21V 33/0044 (2013.01); G02B 6/0073 (2013.01); F21W 2131/30 (2013.01); F21Y 2101/00 (2013.01)

(58) Field of Classification Search
CPC ....... G02B 6/0038; G02B 6/0073; A47L 9/02; A47L 9/30; F21V 33/0044; F21W 2131/30; F21Y 2101/00
USPC .................................................. 362/613, 602
See application file for complete search history.

(56) References Cited

U.S. PATENT DOCUMENTS

| | | | |
|---|---|---|---|
| 4,757,574 | A | 7/1988 | Sumerau |
| 5,207,498 | A | 5/1993 | Lawrence et al. |
| 6,883,924 | B2 | 4/2005 | Maeda et al. |
| 8,120,726 | B2 | 2/2012 | Suzuki et al. |
| 2014/0340930 | A1 | 11/2014 | Nakagome |

FOREIGN PATENT DOCUMENTS

| | | |
|---|---|---|
| JP | 3138321 U | 12/2007 |
| JP | 2013-172808 | 9/2013 |
| WO | WO2014/154995 | * 10/2014 |

* cited by examiner

*Primary Examiner* — Laura Tso
(74) *Attorney, Agent, or Firm* — Panasonic IP Management; Kerry S. Culpepper

(57) ABSTRACT

A light guide plate which guides light from light sources at both ends and reflection surface grooves having plural types of reflection surfaces formed on a reverse side of the light guide plate are provided in a direction perpendicular to a front direction of a suction tool, thereby forming light rays radiating to a floor surface from three directions and lighting the floor surface as the surface to be cleaned in front of the suction tool over a wide range.

6 Claims, 10 Drawing Sheets

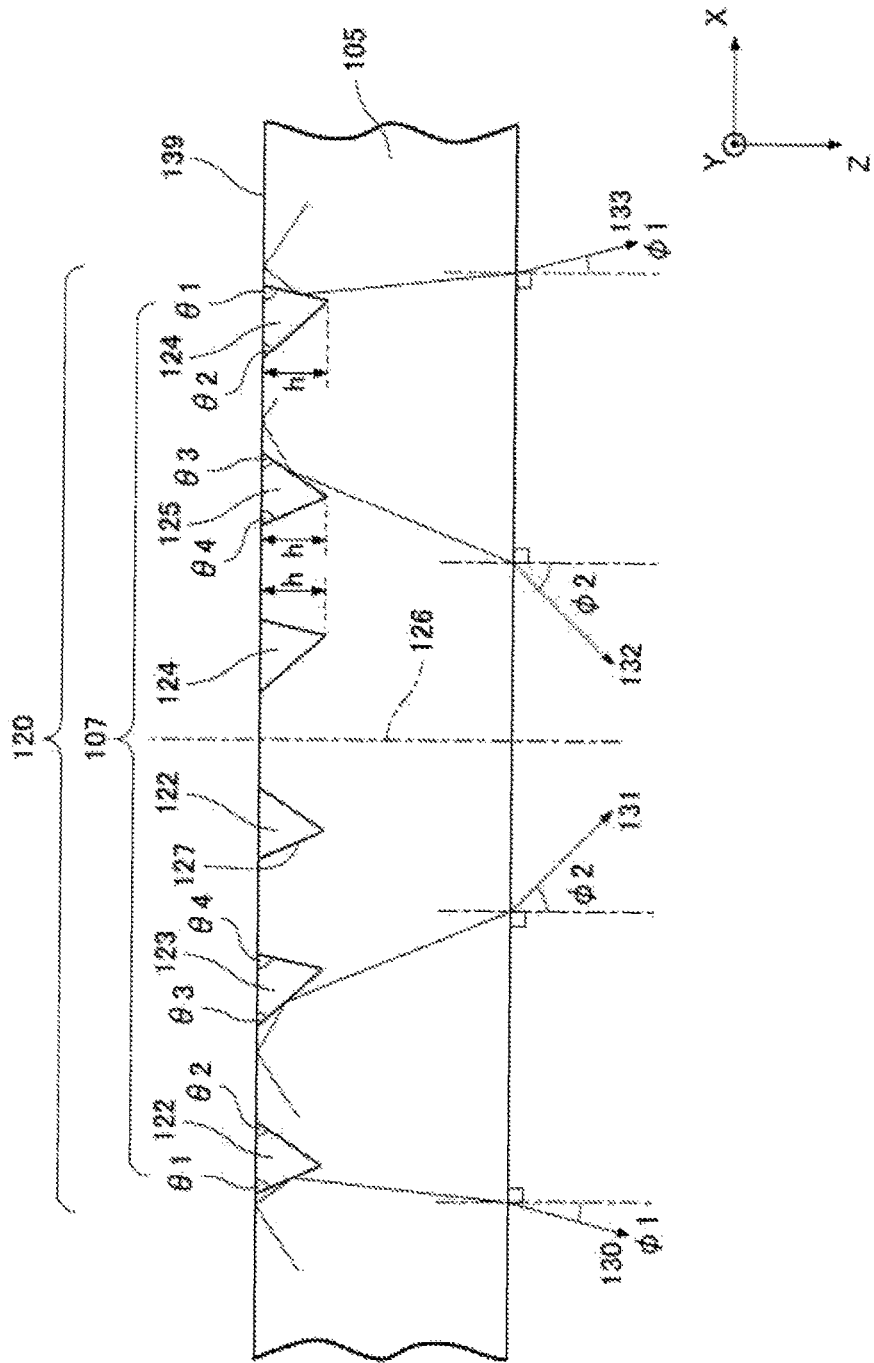

FIG. 6A
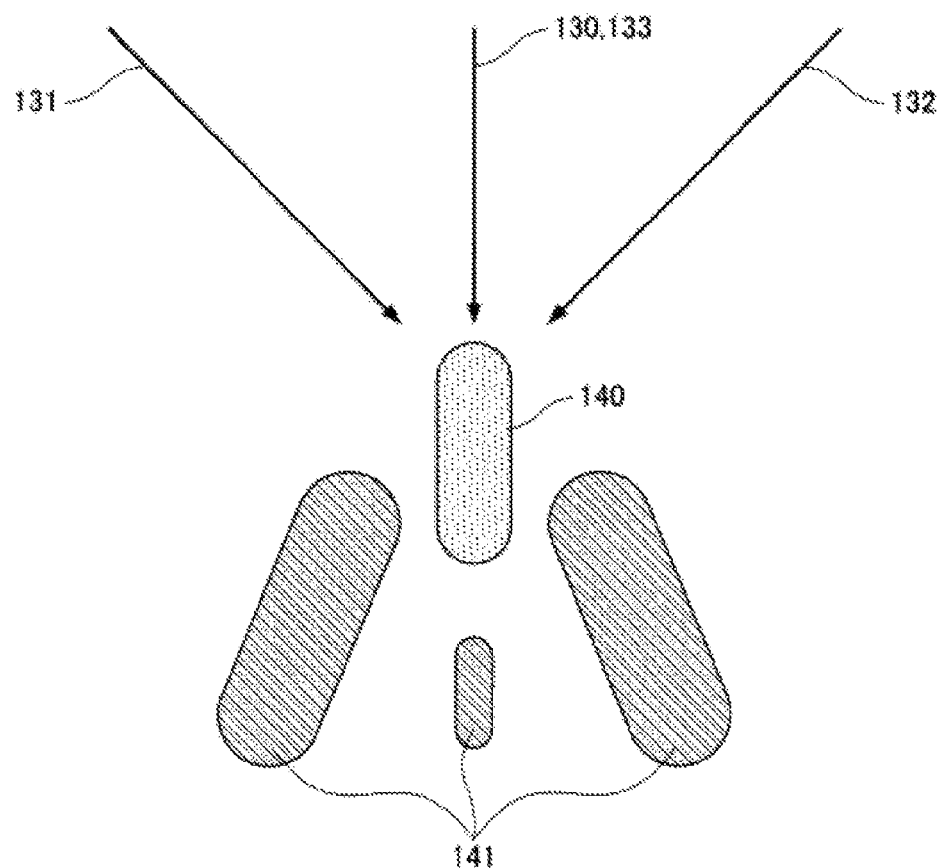
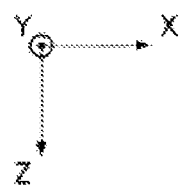

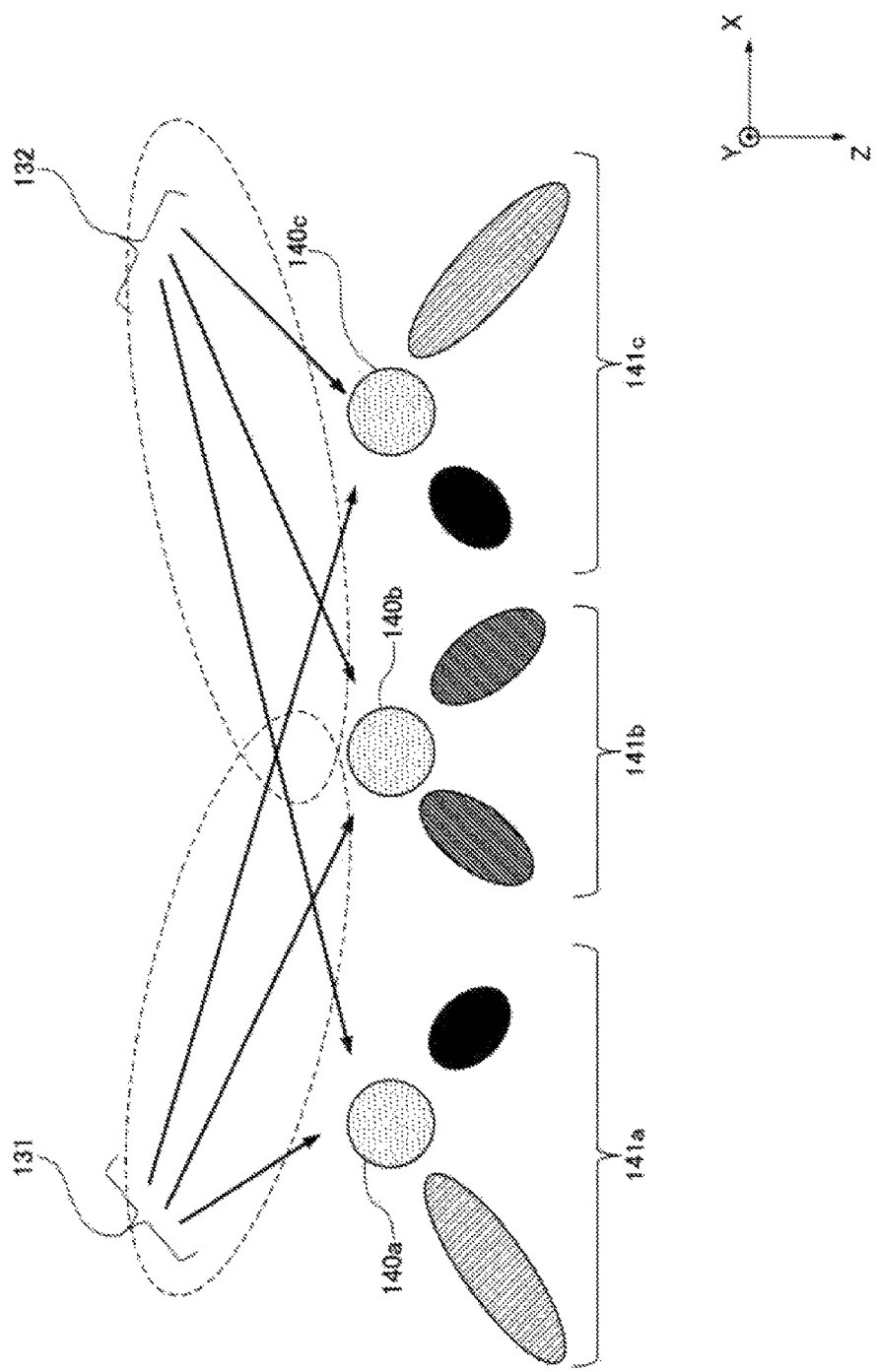

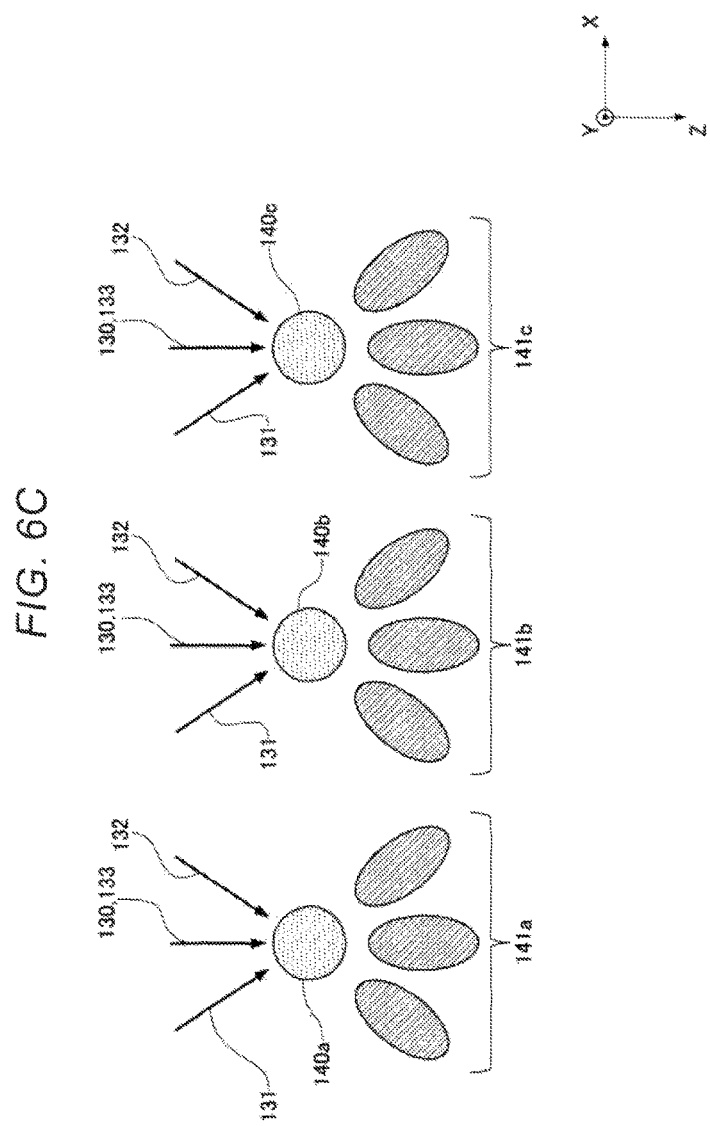

LIGHTING DEVICE FOR VACUUM CLEANER

TECHNICAL FIELD

The technical field relates to a lighting device of a suction tool for a vacuum cleaner.

BACKGROUND

In a suction tool of a vacuum cleaner, a suction nozzle of a vacuum cleaner provided with a lighting device in the suction tool has been hitherto proposed for improving visibility of the dust on a surface to be cleaned.

That is, as shown in FIG. 8, a suction tool 202 in a related-art vacuum cleaner has a suction port 203 in a bottom face and a pair of lighting devices 204 in a front part arranged so that optical axes thereof are almost parallel to each other as well as almost parallel to a floor surface to thereby light the floor surface of irradiated areas 205 in front of the suction tool 202.

An example of the related art includes Japanese Utility Model Registration No. 3138321.

SUMMARY

However, there is room for improvement in the related-art suction tool for the vacuum cleaner from a viewpoint of improving the visibility of the dust on the surface to be cleaned.

That is, the lighting devices are arranged in a front face of the suction tool so that the optical axes of the pair of lighting devices are parallel to the floor surface as well as the optical axes of the pair of lighting devices are parallel to each other in the related-art suction tool of the vacuum cleaner, therefore, portions not illuminated by light radiating from the pair of lighting devices are formed over a wide range on the surface to be cleaned positioned in the vicinity of the center of the front part of the suction tool, and it is sometimes difficult to illuminate the dust existing in the portions not illuminated by light radiating from the pair of lighting devices by the pair of lighting devices. Accordingly, there is a problem that it is difficult for a user to visually recognize the dust existing in the portions not illuminated by light radiating from the pair of lighting devices positively. There is also a case where the dust remains as shadows of the dust made by light radiating from the pair of lighting devices are small, and are thereby difficult for the user to see.

In view of the above problems, an object of the present disclosure is to improve the visibility of the dust on the surface to be cleaned.

According to an embodiment, a lighting device for a vacuum cleaner which performs cleaning while moving a suction tool having a suction port for sucking the dust into a lower surface facing a surface to be cleaned, which includes a light guide plate provided in the suction tool, which extends in a direction crossing a moving direction of the suction tool and parallel to the surface to be cleaned, guiding light so as to be reflected thereinside and emitting the guided light from an emitting surface facing the moving direction, light sources provided in both ends of the light guide plate in the extending direction, and plural reflection surface grooves formed on a reverse surface of the light guide plate which is a surface opposite to the emitting surface, in which the reflection surface grooves have reflection surfaces reflecting light from the light sources, light reflected on the reflection surfaces and emitted from the emitting surface radiates to the surface to be cleaned from plural directions, and angles made by the reflection surfaces of respective reflection surface grooves and the reverse surface differ from one another.

When the suction tool for the vacuum cleaner according to the embodiment is applied, the light guide plate guiding light from the light sources at both ends and reflection surface grooves having plural types of reflection surfaces formed on a reverse side of the light guide plate are provided in a direction perpendicular to a front direction of the suction tool, thereby forming light rays radiating to a floor surface from three directions and lighting the floor surface as the surface to be cleaned in front of the suction tool over a wide range, which makes shadows of the dust be easily recognized by sight and improves the visibility.

BRIEF DESCRIPTION OF THE DRAWINGS

FIG. 4 is a cross-sectional view showing a structure of the prisms at the center of the light guide plate according to the exemplary embodiment;

FIG. 6A is a view showing examples of shadows of a dust according to the exemplary embodiment;

FIG. 6B is a view showing examples of shadows of dusts obtained when a pair of lighting devices are diagonally attached to a related-art suction tool for a vacuum cleaner;

FIG. 6C is a view showing examples of shadows of dusts made by the lighting device of the suction tool according to the exemplary embodiment;

DESCRIPTION OF EMBODIMENTS

Hereinafter, an exemplary embodiment of a suction tool for a vacuum cleaner will be explained with reference to the drawings.

Embodiment 1

Figure 1:
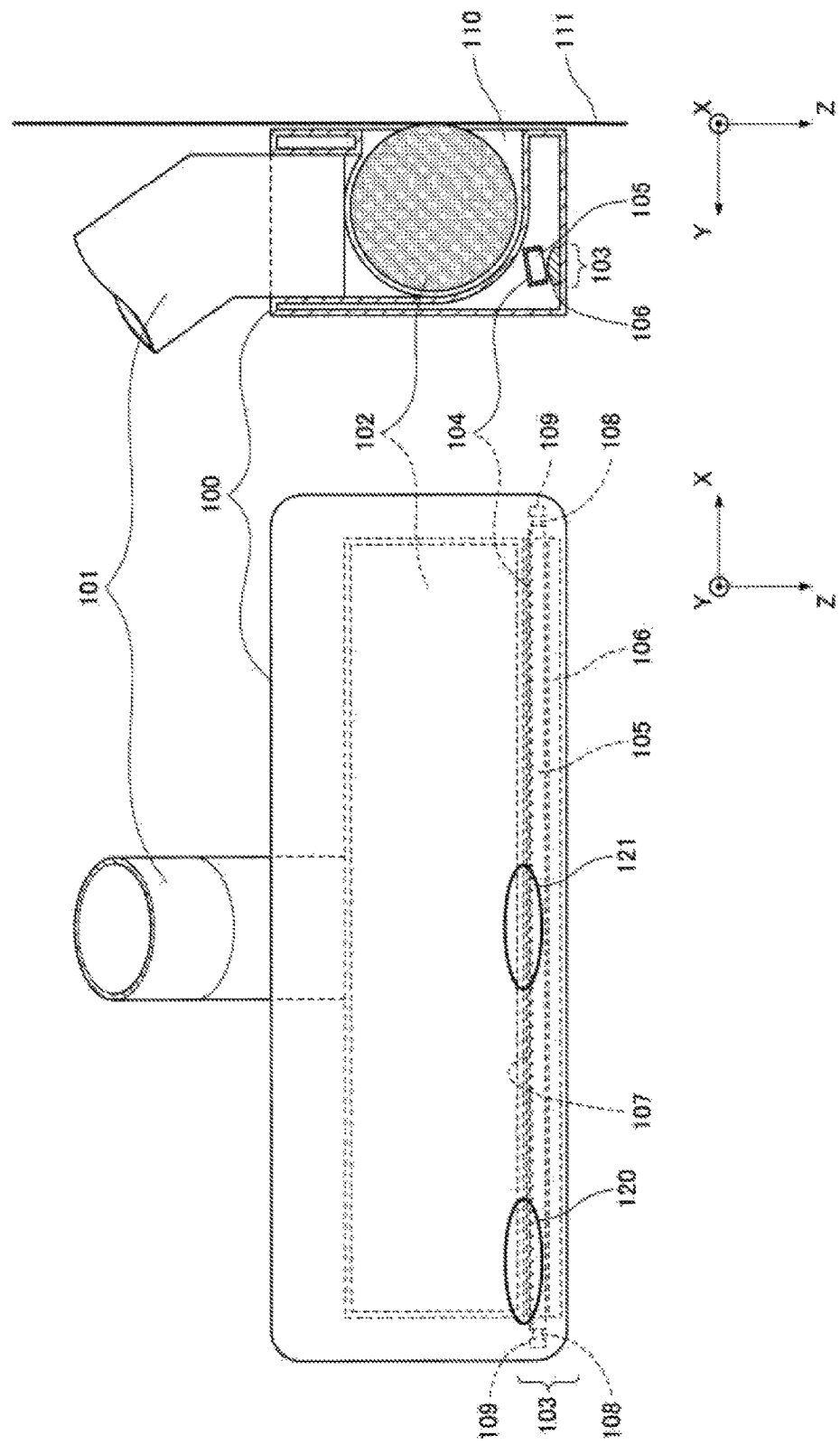
FIG. 1 is a schematic view of a suction tool for an electric vacuum cleaner according to an exemplary embodiment.

FIG. 1 is a schematic view of a suction tool for a vacuum cleaner according to an exemplary embodiment, in which cross sections of an upper surface and a side surface of the suction tool are shown together. The cross sections correspond to a YZ plane. In coordinate axes, a Z-axis positive direction is set as a front direction, and illumination light radiates toward the front direction by a lighting device to highlight the dust. A Y-axis positive direction is set as an upper direction, and a floor surface is arranged along a Y-axis negative direction. An X-axis direction is set as a right direction on paper in the upper surface view of FIG. 1.

In FIG. 1, 100 denotes a suction tool, 101 denotes a connection pipe arranged in the suction tool 100 and 102 denotes a rotating brush collecting the dust.

In the suction tool 100, a hose connecting to a not-shown cleaner body is connected to the connection pipe 101. When suction is performed by a motor of the not-shown cleaner body, the dust collected by the rotating brush 102 is taken into the suction tool 100 from a suction port 110 of FIG. 1, and the dust passes through the connection pipe 101 and is sucked into the cleaner body thorough the cleaner hose. The suction port 110 is formed in a lower surface of the suction tool 100, which faces a floor surface 111 as a surface to be cleaned. The suction tool 100 sucks the dust existing in a moving direction on the floor surface 111 while moving in the Z-axis positive direction (referred to as the moving direction) as the front direction of the suction tool 100.

103 denotes a lighting device, which is arranged in a front part of the suction tool 100 and applies light at an angle close to being parallel to the floor surface 111 to illuminate the floor surface 111 brightly as well as makes shadows of the dust on the floor surface 111 so that the dust can be easily recognized by sight. The front direction of the suction tool 100 is a direction in which the suction tool 100 is moved at the time of cleaning, and the suction tool 100 sucks the dust in the front direction as the moving direction to clean the dust.

104 is a reflector of a white color and so on for diffusing and reflecting visible light, which is arranged so as to wrap a light guide plate 105 except an emitting surface of the light guide plate 105. The reflector 104 does not closely contact the light guide plate 105, and it is preferable to form an air layer between them so as not to interfere with the total reflection inside the light guide plate 105. A material of the reflector 104 is, for example, a resin plate into which fine bubbles are mixed inside the reflector 104, having a high reflectance close to 100%. The light leaking from a prism 107 of the light guide plate 105 radiates in the moving direction as the front direction, namely, in the Z-axis positive direction. The leaking light not entering end faces of the light guide plate 105 from LEDs 108 is also reflected on the reflector 104 to be incident on the light guide plate 105 again.

The light guide plate 105 is a long transmissive resin substrate having a rectangular shape in cross section, and a material thereof is a transparent resin such as acrylic or polycarbonate. The light guide plate 105 has a shape elongated in the X-axis direction which is parallel to the front face of the suction tool 100 and perpendicular to the moving direction. The light guide plate 105 applies light to the floor surface 111 from the front face (referred to as the emitting surface) as the moving direction. On a reverse surface with respect to the emitting surface of the light guide plate 105, namely, on a surface in the Z-axis negative direction, the prism 107 is formed so as to cover the whole reverse surface of the light guide plate 105. The LEDs 108 are arranged on both end faces in the X-axis direction of the light guide plate 105, and the LEDs 108 make light incident on the light guide plate 105. It is preferable that the light guide plate 105 is arranged so that a plane in a normal direction on the reverse surface of the light guide plate 105 is slightly inclined to the floor surface direction.

106 denotes a window member formed of a resin substrate made of a transmissive material which is highly resistant to shock, which serves both as a protection cover and a lens. The window member 106 adjusts distribution of light so that the floor surface 111 is uniformly irradiated with the emitted light emitted from the light guide plate 105. A lens surface is an aspherical cylindrical lens, and a lens axis of the cylindrical lens is parallel to the X-axis direction. The lens surface faces the direction of the light guide plate 105, and an opposite surface with respect to the light guide plate 105 is a flat surface. The window member 106 is arranged in an inner side of the suction tool 100 from the surface of an outer case of the suction tool 100, which prevents the window member 106 from directly contacting a wall when the suction tool contacts the wall at the time of cleaning. However, when it is not necessary to consider the effect by shock and it is not necessary to adjust the distribution of light, the window member 106 can be omitted.

107 denotes a prism formed on the reverse surface of the light guide plate 105.

108 denotes an LED emitting light of a white diffused light and so on, which is arranged near an end face of the light guide plate 105. Most of emitted light from the LED 108 is incident on the light guide plate 105.

109 denotes an LED substrate in which the LED 108 is arranged, which is made of glass epoxy. It is preferable that a white coating is applied to the surface in which the LED 108 is arranged.

The lighting device 103 includes the reflector 104, the light guide plate 105, the window member 106, the LEDs 108 and the LED substrates 109.

110 denotes a suction port provided on a bottom face of the suction tool 100.

111 denotes a floor surface to be cleaned, on which the dust exists.

120 denotes a left end portion of the light guide plate 105, namely, the vicinity of the end portion in the X-axis negative direction.

121 denotes the vicinity of the center of the light guide portion 105.

Next, the detail structure of the prism 107 will be explained.

Figure 2:
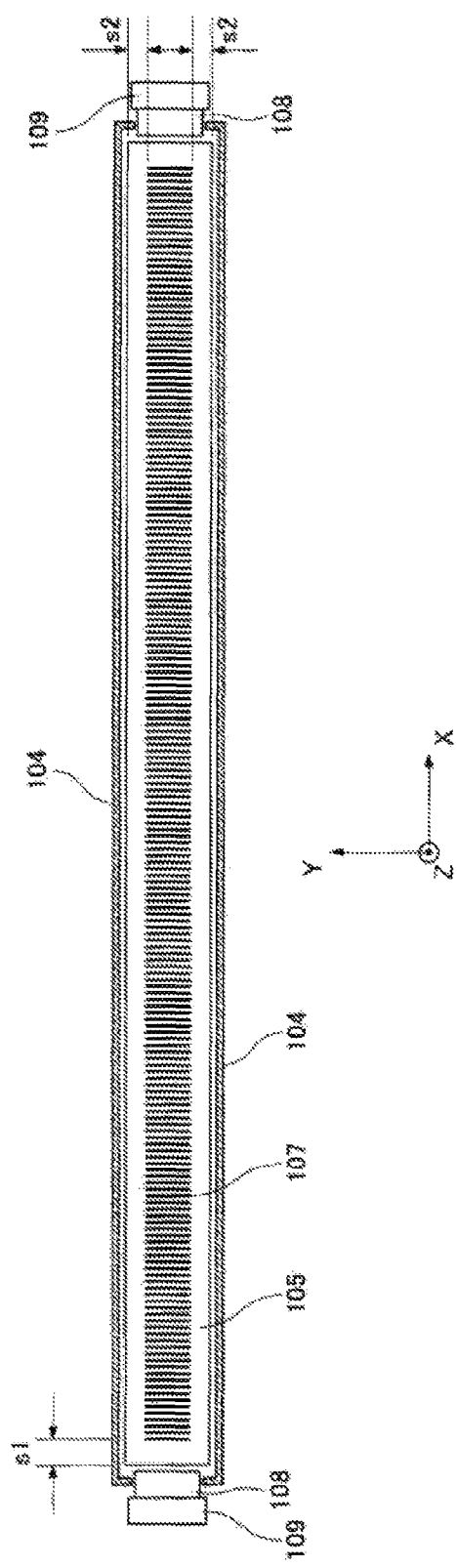
FIG. 2 is a schematic view showing a structure of a light guide plate according to the exemplary embodiment.
Figure 3:
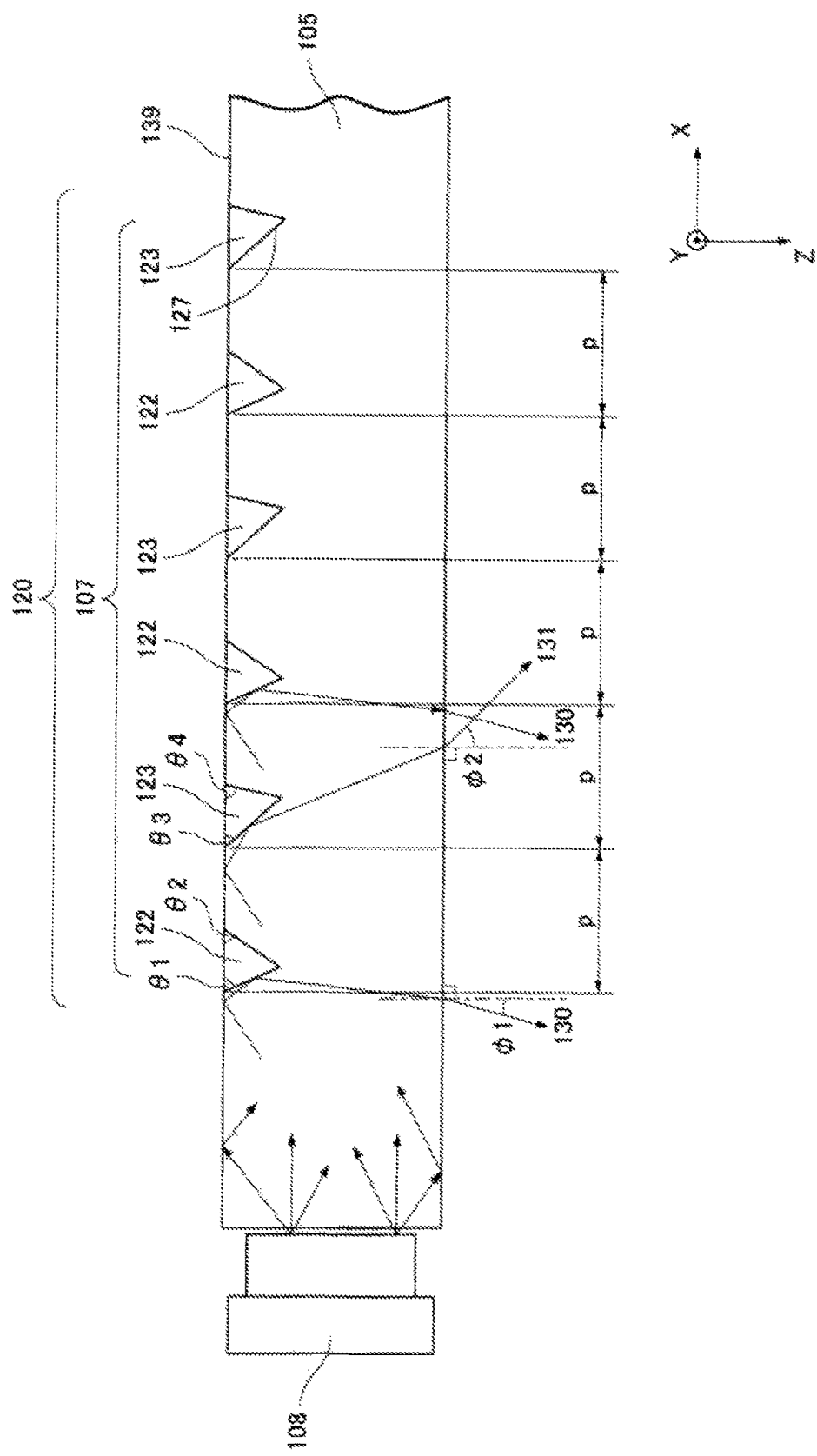
FIG. 3 is a cross-sectional view showing a structure of prisms at an end portion of the light guide plate according to the exemplary embodiment.

FIG. 2 is a schematic view showing a structure of the light guide plate according to the embodiment, FIG. 3 is a cross-sectional view showing a structure of the prism at the end portion of the light guide plate according to the embodiment and FIG. 4 is a cross-sectional view showing a structure of the prism in the center of the light guide plate according to the embodiment 1, which shows the prism 107 formed in the light guide plate 105. FIG. 2 is the view of the light guide plate 105 seen from the front direction, namely, from the Z-axis negative direction, FIG. 3 shows a cross-sectional shape of the left end 120 shown in FIG. 1, namely, the prism 107 in the vicinity of the end portion of the light guide plate 105 in the X-axis negative direction and FIG. 4 shows a cross-sectional shape of the prism 107 in the vicinity of the center 121 of the light guide plate 105 in FIG. 1.

In FIG. 2, FIG. 3 and FIG. 4, members denoted by the same numerals as FIG. 1 are the same members.

As shown in FIG. 2, the prism 107 is formed a distance s1 inside from both end faces in the X-axis direction of the light guide plate 105 as well as a distance s2 inside both end faces in the Y-axis direction of the light guide plate, and a groove direction of the prism 107 is parallel to the Y axis.

The distances s1 and s2 are both set to at least 0.5 mm or more, thereby preventing bright lines, stray light and the like due to abnormal reflected light by the prism 107 caused by shape distortion in the vicinity of end surfaces of the light guide plate 105.

As shown in FIG. 3, the prism 107 may be optionally provided with first prisms 122 and second prisms 123, and it is preferable that these prisms are alternately arranged. The first prisms 122 and the second prisms 123 are arranged at equal intervals "p".

An angle made by a reflection surface 127 of the first prism 122 and the bottom surface, namely, a reverse surface 139 of the light guide plate 105 which is closer to the LED 108 is denoted by θ1 and an angle of the above which is farther from the LED 108 is denoted by θ2. An angle made by a reflection surface 127 of the second prism 123 and the bottom surface, namely, the reverse surface 139 of the light guide plate 105 which is closer to the LED 108 is denoted by θ3 and an angle of the above which is farther from the LED 108 is denoted by θ4.

In the first prism 122 and the second prism 123, θ1 is larger than θ3. Moreover, it is experimentally found that it is preferable that θ1 is equal to or larger than θ2 in the first prism 122, and that it is preferable that θ3 is smaller than θ4 in the second prism 123. For example, values are set as follows:

θ1=62 degrees, θ2=42 degrees, θ3=15.5 degrees and θ4=68.5 degrees.

The light guide plate 105 has a symmetrical shape, and the prism 107 is formed by the first prism 122, the second prism 123, a third prism 124 and a fourth prism 125 in the vicinity of the center 121 of the light guide plate 105 as shown in FIG. 4. The first prism 122 and the third prism 124 as well as the second prism 123 and the forth prism 124 have right-and-left plane symmetrical shapes about a cross section of a center line 126 in the X-axis direction of the light guide plate 105. A height "h" of the prism which is a length in the Z-axis positive direction can be formed so as to be gradually increased toward the vicinity of the center 121 of the light guide plate 105 with respect to the vicinity of the LED 108 by setting the reverse surface 139 as the surface on which the prism 107 of the light guide plate 105 is formed as a reference surface. Accordingly, it is easy to reflect and emit light from the LED 108 even in the prism 107 which is farther from the LED 108.

Next, the operation of the lighting device for the suction tool having the above structure will be explained. The lighting by the lighting device seen from the upper direction, namely, the Y-axis direction will be explained.

As shown in FIG. 3 and FIG. 4, the light radiating from the LED 108 is incident from an end face of the light guide plate 105 in the X-axis direction and propagates inside the light guide plate 105 while being totally reflected. As the prism 107 is formed in the light guide plate 105, light propagating inside the light guide plate 105 is totally reflected on the reflection surface 127 as a side face of the prism 107 and is emitted from the light guide plate 105 after an optical path thereof is changed. The propagating light inside the light guide plate 105 will be light rays having various directions due to the reflection inside the light guide plate 105, therefore, light reflected on the prism 107 and emitted from the light guide plate 105 will be light rays with the variety of angles.

The prism 107 includes the first prisms 122 and the second prisms 123 having the reflection surfaces 127 with different angles.

Light rays 130 reflected on the first prisms 122 are reflected on the reflection surfaces 127 with the angle θ1, and emitted from the light guide plate 105. The angle θ1 is adjusted so that a direction in which the light intensity is the highest in the light rays reflected on the prisms 122 and emitted from the light guide plate 105 is the front direction, namely, the Z-axis positive direction. Here, when the angle θ1 is set to be larger than an angle in which the emitted light rays are emitted in the Z-axis positive direction, the direction in which the intensity is the highest will be an direction of a light ray slightly inclined in the direction of the LED 108, namely, in the X-axis negative direction by an angle φ1. The angle φ1 is approximately 10 degrees. A light ray 131 reflected on the second prism 123 is reflected on the reflection surface 127 with the angle θ3 and emitted from the light guide plate 105. A direction in which the light intensity is the highest in the light rays reflected on the prisms 123 and emitted from the light guide plate 105 will be a direction of a light ray largely inclined to the X-axis direction from the front direction by an angle φ2. The angle φ2 is approximately 45 degrees.

As φ1 is larger than φ3, the light emitted from the first prism 122 will have an angle close to the Z-axis positive direction as the moving direction, and the light emitted from the second prism 123 tends to have a direction diagonally inclined to the X-axis direction from the moving direction.

As the light guide plate 105 has the right-and-left symmetrical shape, the third prism 124 and the fourth prism 125 are the same as the first prism 122 and the second prism 123. The light ray reflected on the third prism 124 is denoted as a light ray 132 and the light ray reflected on the fourth prism 125 is denoted as a light ray 133.

Figure 5A:
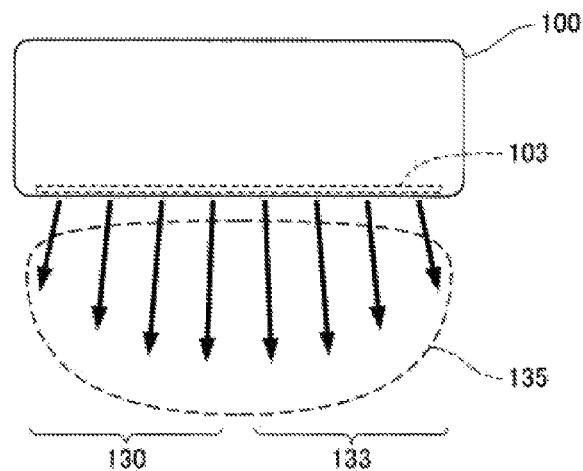
FIG. 5A is a view showing a lighting state by a lighting device according to the exemplary embodiment.
Figure 5B:
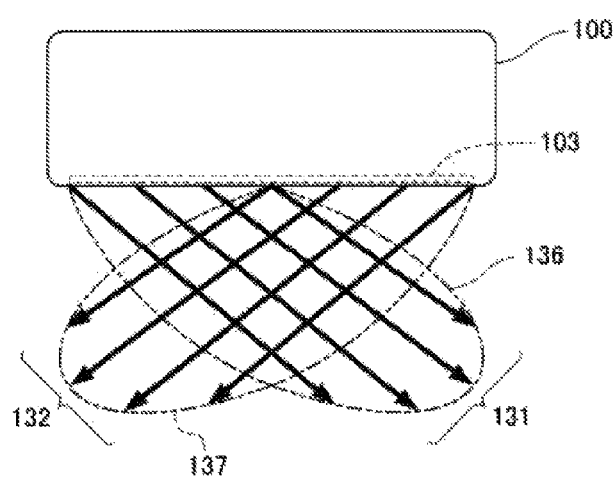
FIG. 5B is a view showing a lighting state by the lighting device according to the exemplary embodiment.
Figure 5C:
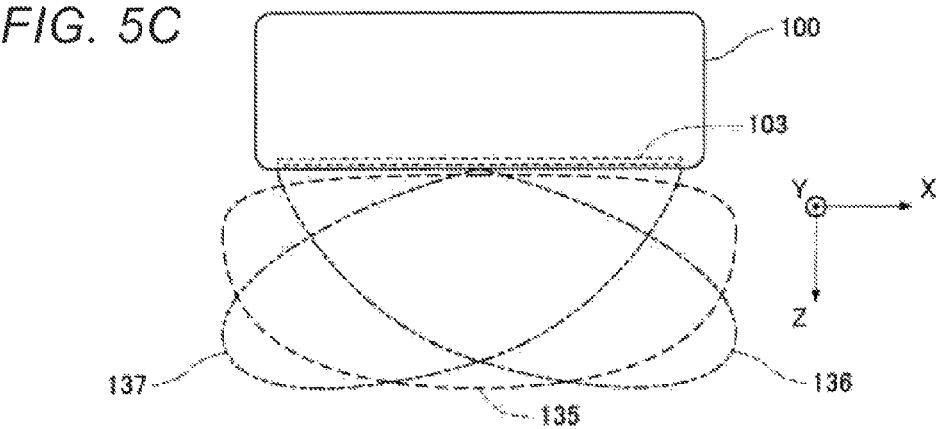
FIG. 5C is a view showing a lighting state by the lighting device according to the exemplary embodiment.

FIGS. 5A to FIG. 5C are views showing lighting states by the lighting device according to the embodiment, which are views showing irradiated areas by the lighting device 103 seen from the upper direction, namely, to the Y-axis negative direction. In FIG. 5A to 5C, components denoted by the same numerals as FIG. 1, FIG. 3 and FIG. 4 are the same components.

FIG. 5A shows an irradiated area by illumination light by the first prisms 122 and the third prisms 124 with respect to the moving direction, namely, in the Z-axis positive direction.

The light radiating from the LED 108 (see FIG. 3) travels inside the light guide plate 105. At this time, the light travels inside the light guide plate 105 while repeating reflection on an inner wall and so on of the light guide plate 105, therefore, light reaching respective reflection surfaces 127 (see FIG. 3) of the prism 107 is incident from various directions. Here, as the angles of the reflection surfaces 127 in the first prisms 122 and the third prisms 124, θ1 is equal to or larger than θ2, and the inclination of the reflection surface 127 with respect to the reverse surface of the light guide plate 105 is larger in the reflection surface 127 which is closer to the LED 108 (see FIG. 3). Accordingly, when the distribution of angles of light incident on the first prisms 122 and the third prisms 124 is uniform, the reflected lights 130 and 133 from the first prisms 122 and the third prisms 124 tend to radiate to the moving direction which is the front direction. According to the above, an irradiated area 135 which is the front part of the suction tool 100 is illuminated by the light rays 130 and 133 from the lighting device 103. The direction of the light ray 130 is slightly inclined to the X-axis negative direction and the direction of the light ray 133 is also slightly inclined to the X-axis positive direction, therefore, the front area of the suction tool 100 can be illuminated over an area wider than the width of the suction tool 100.

Here, the light rays 130 and 133 from the lighting device 103 are shown so as to travel in a uniform direction in FIG. 5A, however, the light rays will travel in various directions by the reflection inside the light guide plate 105 (see FIG. 3), therefore, the light rays 130 and 133 will be light rays with the variety angles. Then, θ1 of the first prism 122 is adjusted so that the light ray is reflected to the Z-axis direction in accordance with the direction of the light ray with the highest light intensity in light rays guided in various directions. For example, in the case where the light intensity in the X-axis direction tends to be the highest in light guide directions of light rays, the reflected light radiates to the Z-axis direction as the front direction when θ1 is 45 degrees.

FIG. 5B shows irradiated areas by illumination light of diagonal directions by the second prisms 123 and the fourth prisms 125 of FIG. 4.

Irradiated areas 136 and 137 existing in a diagonally forward right direction from the left side of the suction tool 100 and in a diagonally forward left direction from the right side are illuminated by the light rays 131 and 132 from the lighting device 103.

FIG. 5C shows areas obtained by overlapping the irradiated areas shown in FIG. 5A and FIG. 5B, which shows the irradiated area by the lighting device.

As the front area of the suction tool 100 is covered by the irradiated areas 135, 136 and 137, uniform and bright illumination can be realized.

In particular, in a portion where three irradiated areas overlap, shadows appear in three directions where the dust exists.

FIG. 6A is a view showing examples of shadows of the dust in the embodiment, which shows shadows made by illuminating the dust.

In FIG. 6A, members denoted by the same numerals as FIG. 4 are the same members. In FIG. 6A, when a dust 140 is irradiated with the light rays 130, 131, 132 and 133, shadows 141 are made in three directions. As an angle made by the light ray 130 and the light ray 133 is small, a shadow made by the light ray 130 and the light ray 133 is one. When the shape of the dust 140 is close to a sphere, similar shadows are made by the light rays from all directions. However, when the dust 140 has a long shape in the Z-axis direction, the shadow is hardly made by illumination from only the Z-axis direction as in related art, and it is difficult to visually recognize the dust. When directions of the light rays are two or more as in the present embodiment, shadows will be generated by any of the light rays and the dust 140 can be visually recognized even though the dust 140 has a long shape. When the front direction, namely, the Z-axis direction is illuminated by the lighting from two directions by the pair of lighting devices of the related-art suction tool of the vacuum cleaner, it is difficult to take a large angle between the two directions of the lighting, and there are not any light components of diagonal directions, therefore, the visibility of the dust 140 is reduced. When the lighting is performed from the three directions, at least two directions with a large angle can be illuminated while illuminating the whole area in front of the suction tool 100. Moreover, in an area where the lighting can be performed from three directions, more shadows can be made and the variation in contrast is increased, which improves the visibility. That is, the visibility can be improved more in the irradiated area shown in FIG. 5C as compared with the irradiated area shown in FIG. 5B.

On the other hand, when the lighting is performed from four directions or more, shadows themselves become thin because lightings in respective directions overlap, and shadows overlap one another to be uniformly thin.

It has been found, from experimental study, that it is easy to visually recognize shadows of the dust 140 when illuminated from the three directions.

FIG. 6B is a view showing examples of shadows of dusts obtained when the pair of lighting devices is diagonally attached to the related-art suction tool of the vacuum cleaner, which shows states of shadows made by illumination applied to dusts existing in places of the front center and both ends of the suction tool. Here, the states of shadows are shown, which are made when dusts 140*a*, 140*b* and 140*c* having a spherical shape exist at three spots of a left end, the center and a right end with respect to the Z-axis direction of the suction tool.

In FIG. 6B, when the dust 140*b* in the center is irradiated with the light lays 131 and 132, shadows with the same length and the same density are made in two directions. However, when the dust 140*a* in the left end is irradiated with the light ray 131, a short and thick shadow is made, and when the dust 140*a* is irradiated with the light ray 132, a long and thin shadow is made. Moreover, when the dust 140*c* in the right end is irradiated with the light ray 131, a long and thin shadow is made, and when the dust 140*c* is irradiated with the light ray 132, a short and thick shadow is made. This is because the intensity of radiation of the light rays 131 and 132 differs according to the distance to the dusts 140, 140*b* and 140*c,* therefore, the shadow looks different according to the position of the dust, and it may be difficult for a person to visually recognize the dust.

FIG. 6C shows examples of shadows of dusts by the lighting device of the suction tool according to the present embodiment, which shows states of shadows made by illumination applied to dusts existing in places of the front center and both ends of the suction tool. Here, the dusts are assumed to exist in the same positions as FIG. 6B.

As shown in FIG. 6C, the light rays 130, 131, 132 and 133 radiating from the lighting device 103 (see FIG. 1) are uniformly applied in the X-axis direction of the lighting device 103 (see FIG. 1) in the case of the present embodiment, therefore, shadows of the dust 140*a* in the left end, the dust 140*b* in the center and the dust 140*c* in the right end are made in the same manner. Accordingly, the same visibility can be secured even when the positions of the dusts differ such as the center and both ends of the suction tool.

Next, illumination by the lighting device in the YZ cross section will be explained.

Figure 7:
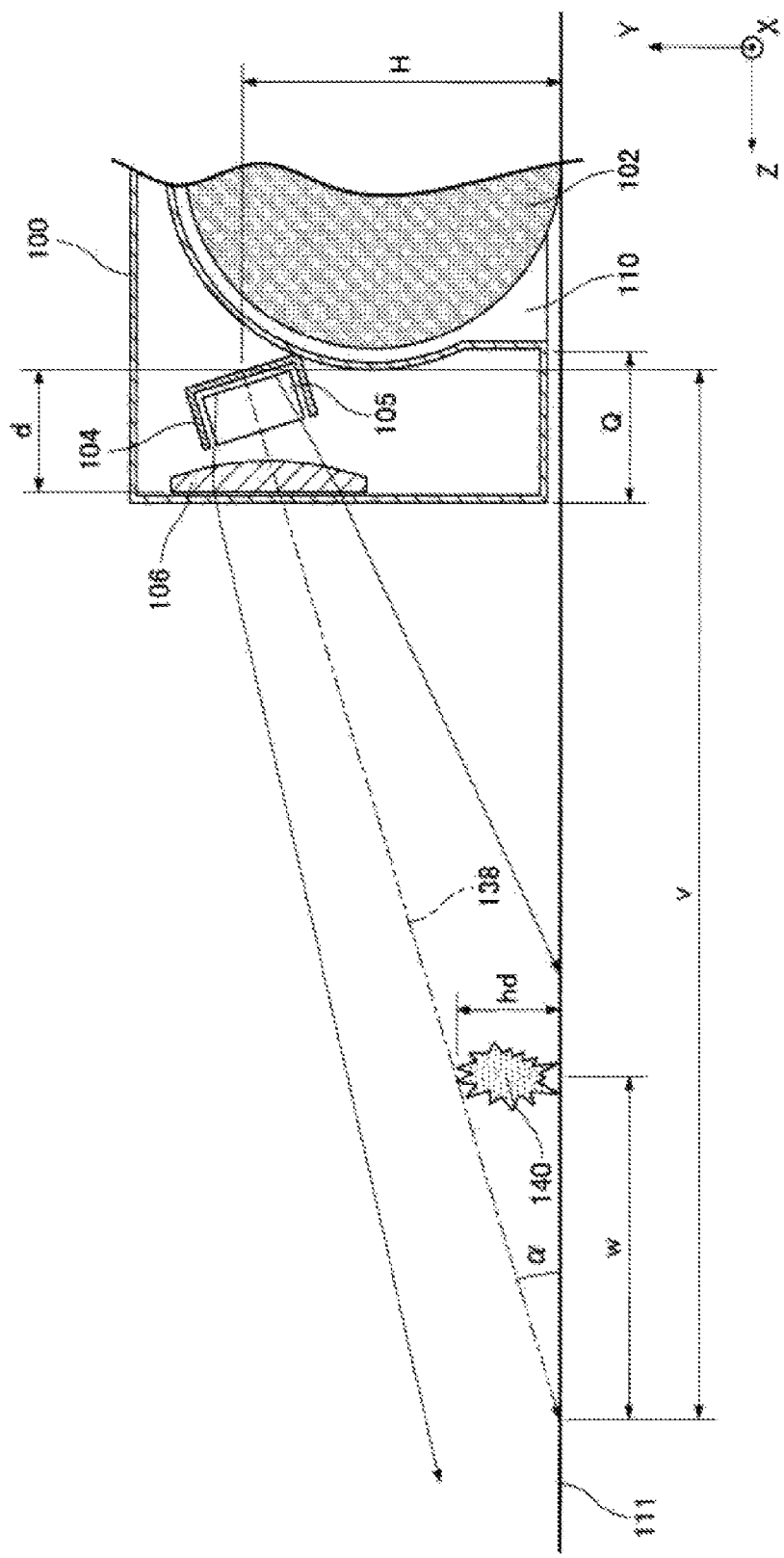
FIG. 7 is a view showing a lighting state by the lighting device according to the exemplary embodiment.
Figure 8:
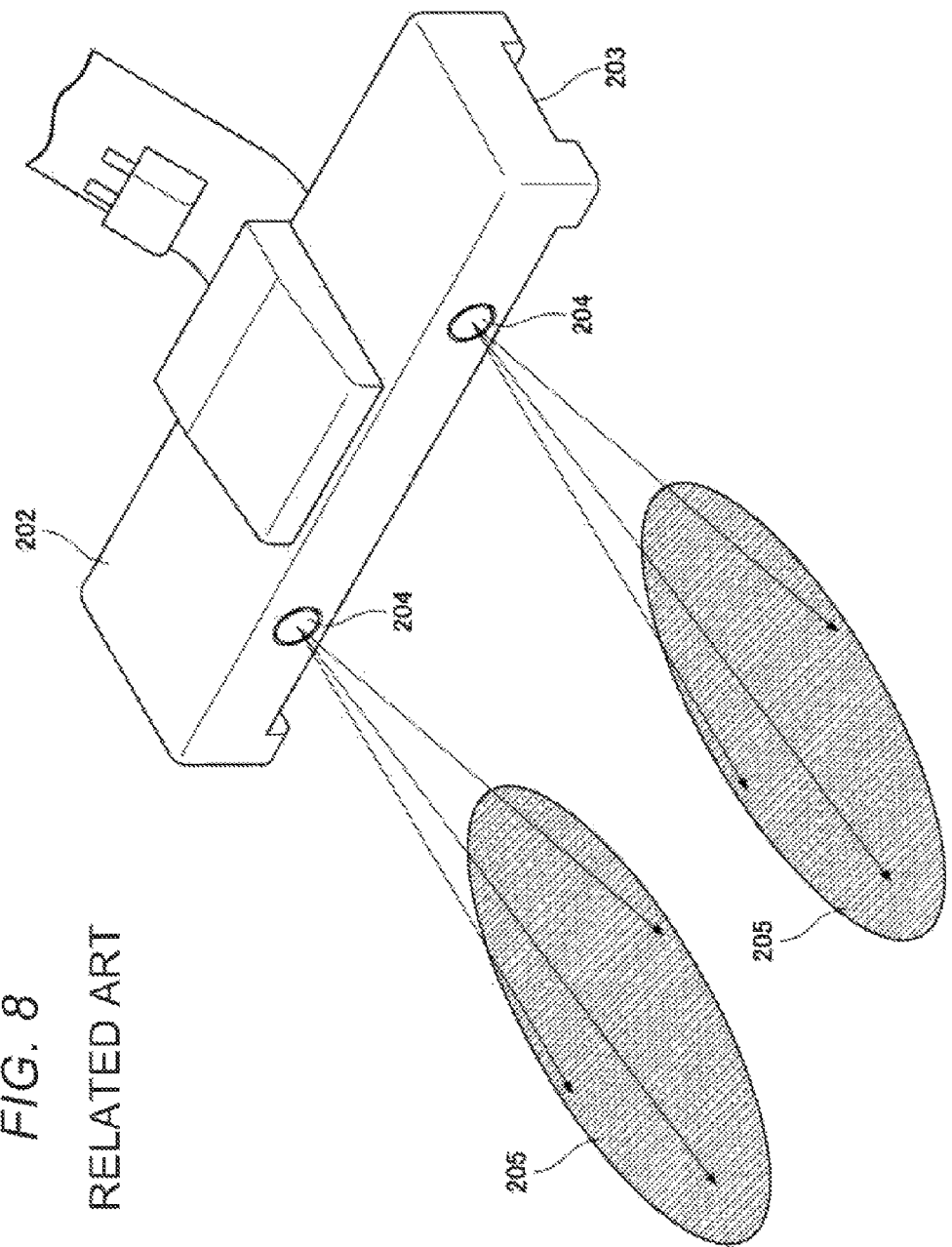
FIG. 8 is an entire perspective view of a related-art suction tool for a vacuum cleaner described in Patent Document 1.

FIG. 7 shows a lighting state by the lighting device according to the embodiment, which shows the YZ cross section of the lighting device.

In FIG. 7, members denoted by the same numerals as FIG. 1 and FIG. 6 are the same members.

138 denotes a light ray from the light guide plate 105. A direction of the light ray 138 corresponds to a normal direction of the reverse surface of the light guide plate 105, which is the surface on which the prism 107 is formed in the light guide plate 105. An angle made by the light ray 138 and the floor surface 111 is α. That is, the light guide plate 105 is inclined so that the angle made by the light ray 138 and the floor surface 111 is α. The distribution of the light ray 138 from the light guide plate 105 is symmetrical, which extends in the X-axis direction, therefore, much light can be irradiated to the floor surface 111 by inclining the normal direction of the forming surface of the prism 107 in the light guide plate 105 to the direction of the floor surface 111.

The smaller the angle α between the light ray 138 and the floor surface 111 is, the longer the shadow of the dust 140 becomes, which improves visibility. When a height of the dust is "hd", a length "w" of the shadow is represented by $w = hd/\tan(\alpha)$, which is increased as the angle α is reduced. When a distance from the light guide plate 105 to a position where the light ray 138 crosses the floor surface 111 is "v" and a height to the floor surface 111 of the light guide plate 105 is H, the angle α is represented by $\tan(\alpha) = H/v$, and it is necessary to lower the position where the lighting device 103 including the light guide plate 105 is arranged for reducing the angle α. When the height of arrangement of the lighting device 103 is lowered, the rotating brush 102 inside the suction tool 100 interferes with the lighting device 103, therefore, a distance Q between the front end of the suction tool 100 to the suction port 110 is increased. When the distance Q is increased, the dust 140 existing in the distance Q remains when cleaning places near the wall. Accordingly, it is necessary to reduce the length of the lighting device 103 in the Z-axis direction.

In a common lighting device in which a lens and a shell-type LED are arranged in series on the front surface of the suction tool 100, the length of the LED is long, and a lens structure in which light is spread in the XZ plane for lighting the floor surface 111 and for collecting light in the YZ plane is necessary, therefore, a length "d" of the lighting device in the Z-axis direction has to be long.

On the other hand, the lighting device using the light guide plate 105 is provided with the window member 106, the light guide plate 105 and the reflector 104 which is a thin-plated member in the Z-axis direction, having an advantage that the length "d" in the Z-axis direction can be short. Accordingly, it is possible to avoid the interference with respect to the rotating brush 102 and to arrange the lighting device in a lower position in the front part of the suction tool 100, therefore, lighting can be performed at a small angle with respect to the floor surface 111, which makes shadows of the dust long as well as makes the dust be easily recognized by sight.

The lighting device according to the present embodiment has the structure in which plural prisms are formed on the reverse surface of the light guide plate to which incident light is guided as described above, therefore, light incident from end faces of the light guide plate is diffused by the plural prisms formed in the light guide plate and emitted in the front direction, thereby lighting the surface to be cleaned in front of the suction tool over a wide range, which makes shadows of the dust conspicuous and improves the visibility.

The prisms of the light guide plate include the first prism, the second prism, the third prism and the fourth prism, and the illumination light radiates to the floor surface in the front direction of the suction tool, namely, in the approximately Z-axis direction by the first prism and the third prism, and illumination light radiates to the floor surface in the front diagonal direction of the suction tool by the second prism and the third prism, thereby forming light rays radiating to the floor surface in the three directions, lighting the surface to be cleaned in front of the suction tool over a wide range and forming plural shadows of the dust to be conspicuous, as a result, the visibility can be improved. Moreover, the thickness of the lighting device in the optical-axis direction is made to be thin, thereby arranging the lighting device in a lower position of the suction tool. The lighting is performed at a small angle with respect to the floor surface, thereby making shadows of the dust long as well as improving the visibility.

Though the LEDs 108 each are provided at both end faces in FIG. 1, plural LEDs may be provided at each end face. Various types of light sources may be used, not limited to the LED.

As inclination angles of the reflection surfaces of the prisms, θ1 of the prism 122 and the prism 124 is 62 degrees in the above description, however, θ1 may be in a range of 42 degrees or more to 62 degrees or less as light efficiency in the front direction, namely, in the Z-axis positive direction can be secured 80% or more when the angle φ1 is within ±10 degrees on simulation. θ1 may also be in a range of 30 degrees or more to 65 degrees or less, though the light efficiency is reduced. θ3 of the prism 123 and the prism 125 is 15.5 degrees in the above description, however, θ3 may be in a range of 5 degrees or more to 25 degrees or less as light efficiency in the direction 45 degrees inclined to the front direction can be secured 80% when the angle φ2 is 35 degrees or more to 55 degrees or less. θ3 may also be less than 30 degrees, though the light efficiency is reduced.

Though the first prisms 122 and the second prisms 123 in FIG. 4 have equal intervals, the prism intervals can be unequal by adjusting the prism height.

The light guide plate 105 may be formed of a transmissive member, in which a reflective film such as an aluminum deposition film may be formed on an outer peripheral portion except the emitting surface to the front direction in the Z-axis positive direction and both end faces in the X-axis direction to propagate the light by total reflection and to take the light out from the prisms. The reflectance of the common aluminum reflective film is approximately 85%, but the film is effective for preventing stain.

Though the light guide plate 105 has a rectangular shape in cross section in FIG. 1, it is also preferable to apply a structure having an angle inclination in an outer periphery for providing a draft at the time of molding.

Though the lens surface of the window member 106 faces the light guide plate 105 and the opposite side with respect to the light guide plate 105 is made to be the flat surface in the above description, it is also preferable that lens surfaces are provided on both surfaces of the window member 106. It is also preferable that both surfaces of the window member 106 are made to be flat surfaces and that the lens surface is provided on the light emitting surface of the light guide plate 105. However, when the lens surface is provided in the light guide plate 105, the lens has a short focal length, therefore, a lens with a small curvature will be necessary and the thickness of the light guide plate 105 tends to be increased.

Though the first prisms 122 and the second prisms 123 are alternately arranged for improving the appearance of the suction tool 100 in the above description, other arrangements may be applied as long as the visibility of the dust is the same.

In the prism 107, regions surrounded by the reflection surfaces 127 may be filled with a material having a different reflectance from that of the light guide plate 105, and reflection surface grooves which are grooves having at least the reflection surfaces 127 may be provided. The reflection surface groove is formed so as to extend in the Y-axis direction or a direction parallel to the inclination angle on the reverse surface of the light guide plate 105, and side surfaces in the X-axis direction correspond to the reflection surfaces 127. The cross-sectional shape of the reflection groove is not limited to a triangular shape but any shape can be applied as long as the reflection surfaces 127 are formed on side faces. The light reflected on the reflection surfaces 127 preferably radiate in three directions including the Z-axis direction as the front direction in which the suction tool 100 moves and downward directions corresponding to the inclination angles of the Z-axis direction. The angles of the reflection surfaces 127 are adjusted so that the light reflected on the respective reflection surfaces 127 radiates in any of the three directions by adjusting the angles of respective reflection surfaces 127 with respect to the reverse surface. It is optimum that the light radiates in three directions as described above, however, it is also preferable that the light radiates in plural directions.

The lighting device according to the present embodiment can improve visibility by making shadows of the dust easily recognized by sight. Therefore, the lighting device is useful for the suction tool of the vacuum cleaner.

What is claimed is:

1. A lighting device for a vacuum cleaner, the vacuum cleaner performing cleaning while a suction tool having a suction port is moved, the suction port sucking dust into a lower surface facing a surface to be cleaned, the lighting device comprising:
    a light guide plate provided in the suction tool, the light guide plate extends in a direction crossing a moving direction of the suction tool and parallel to the surface to be cleaned, the light guide plate guiding light so as to be reflected thereinside and emitting the guided light from an emitting surface facing the moving direction;
    light sources provided in both ends of the light guide plate in the extending direction; and
    plural reflection surface grooves formed on a reverse surface of the light guide plate which is a surface opposite to the emitting surface,
    wherein the reflection surface grooves have reflection surfaces reflecting light from the light sources,
    light reflected on the reflection surfaces and emitted from the emitting surface radiates to the surface to be cleaned from plural directions, and
    angles made by the reflection surfaces of respective reflection surface grooves and the reverse surface differ from one another.

2. The lighting device for the vacuum cleaner according to claim 1,
    wherein the plural directions are three directions including the moving direction.

3. The lighting device for the vacuum cleaner according to claim 2,
    wherein a first reflection surface groove, a second reflection surface groove, a third reflection surface groove, and a fourth reflection surface groove are arranged as the reflection surface grooves,
    the third reflection surface groove and the fourth reflection surface groove respectively have plane symmetrical shapes with respect to the first reflection surface groove and the second reflection surface groove about a cross section at the center of the light guide plate in the extending direction,
    the first reflection surface groove and the third reflection surface groove reflect the light in the moving direction,
    the second reflection surface groove and the fourth reflection surface groove reflect the light in directions inclined to the moving direction which are opposite to each other.

4. The lighting device for the vacuum cleaner according to claim 3,
    wherein angles existing inside the reflection surface grooves are defined as inclination angles in the angles made by the reverse surface and the reflection surfaces,
    the inclination angle of the first reflection surface groove is larger than the inclination angle of the second reflection surface groove, and
    the inclination angle of the third reflection surface groove is larger than the inclination angle of the fourth reflection surface groove.

5. The lighting device for the vacuum cleaner according to claim 4,
    wherein the lighting device is formed by including the light guide plate and the light sources provided in both ends of the light guide plate in the extending direction to thereby shorten a length of the suction tool of the lighting device in the moving direction.

6. The lighting device for the vacuum cleaner according to claim 1,
    wherein the distance between an end portion of the reflection surface grooves in the moving direction and the reverse surface is increased from the end portion of the light guide plate toward the center of the light guide plate.

* * * * *